(12) United States Patent
Aijima

(10) Patent No.: US 12,388,141 B2
(45) Date of Patent: Aug. 12, 2025

(54) BATTERY PACK

(71) Applicant: TOYOTA JIDOSHA KABUSHIKI KAISHA, Toyota (JP)

(72) Inventor: Shingo Aijima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 599 days.

(21) Appl. No.: 17/724,727

(22) Filed: Apr. 20, 2022

(65) Prior Publication Data

US 2022/0416345 A1  Dec. 29, 2022

(30) Foreign Application Priority Data

Jun. 24, 2021  (JP) .................................. 2021-104935

(51) Int. Cl.
*H01M 50/242* (2021.01)
*H01M 50/249* (2021.01)

(52) U.S. Cl.
CPC ....... *H01M 50/242* (2021.01); *H01M 50/249* (2021.01); *H01M 2220/20* (2013.01)

(58) Field of Classification Search
CPC ............. H01M 50/242; H01M 50/249; H01M 2220/20; H01M 10/0481; H01M 50/204; H01M 50/24; H01M 50/289; Y02E 60/10
See application file for complete search history.

(56) References Cited

U.S. PATENT DOCUMENTS

| | | | |
|---|---|---|---|
| 2005/0202311 A1* | 9/2005 | Higashino | H01M 10/6563 |
| | | | 429/158 |
| 2012/0161472 A1 | 6/2012 | Rawlinson et al. | |
| 2016/0141566 A1 | 5/2016 | Hamada | |
| 2021/0376418 A1 | 12/2021 | Terauchi | |

FOREIGN PATENT DOCUMENTS

| | | |
|---|---|---|
| JP | 2012-131486 A | 7/2012 |
| JP | 2019-186038 A | 10/2019 |
| KR | 10-2006-0102661 A | 9/2006 |
| WO | 2015/012292 A1 | 1/2015 |
| WO | 2019/187314 A1 | 10/2019 |

* cited by examiner

*Primary Examiner* — Lisa S Park
(74) *Attorney, Agent, or Firm* — Sughrue Mion, PLLC

(57) ABSTRACT

A battery pack includes a stacked battery and a pair of restraint plates. The stacked battery includes battery cells stacked in a stacking direction parallel to a vehicle up-down direction. At least one of the restraint plates is a specific restraint plate including a first portion and a pair of second portions each having low rigidity against a load input in the stacking direction as compared with the first portion. Each of the second portions is disposed along a direction orthogonal to the specific direction. When viewed from the specific direction, each of the second portions is disposed apart from each other at a location other than a center portion and both end portions of the specific restraint plate.

9 Claims, 9 Drawing Sheets

BATTERY PACK

CROSS-REFERENCE TO RELATED APPLICATION

This application claims priority to Japanese Patent Application No. 2021-104935 filed on Jun. 24, 2021, incorporated herein by reference in its entirety.

BACKGROUND

1. Technical Field

The present disclosure relates to a battery pack mounted on a vehicle.

2. Description of Related Art

Japanese Unexamined Patent Application Publication No. 2012-131486 (JP 2012-131486 A) discloses a battery pack storage mechanism having a structure for absorbing and dispersing impact energy at the time of a side collision of a vehicle. The battery pack storage mechanism includes a plurality of cross members provided such that the cross members extend in a vehicle width direction (right-left direction), and is fastened to a vehicle body member. The cross members have a function as a partition wall for a battery housed in the battery pack storage mechanism and a function of protecting a plurality of the batteries at the time of a side collision. In addition, in this battery pack storage mechanism, a battery pack module composed of battery cells is disposed in each area partitioned by each of the cross members.

SUMMARY

It is considered that a battery pack is configured to include a stacked battery including a plurality of battery cells stacked in a stacking direction parallel to a vehicle up-down direction and a pair of restraint plates having a quadrangular shape when viewed from the stacking direction and pressurizing and restraining the stacked battery from both sides of the stacked battery in the stacking direction by a restraint load applied to both ends of each of the restraint plates in a specific direction parallel to one side of the quadrangular shape. The battery pack having such a configuration is required to apply a uniform restraint surface pressure to the stacked battery using the restraint plates. Further, in the battery pack, it is difficult to adopt an anti-collision structure provided in the battery pack storage mechanism described in JP 2012-131486 A inside the battery pack due to its configuration.

The present disclosure has been made in view of the above issue, and an object of the present disclosure is to provide a battery pack that enables a uniform restraint surface pressure to be applied to the stacked battery while suppressing an increase in weight of the restraint plate, and impact resistance performance to be improved.

A battery pack according to the present disclosure includes a stacked battery and a pair of restraint plates. The stacked battery includes a plurality of battery cells stacked in a stacking direction parallel to a vehicle up-down direction. Each of the restraint plates has a quadrangular shape when viewed from the stacking direction, and the restraint plates pressurize and restrain the stacked battery from both sides of the stacked battery in the stacking direction by a restraint load applied to both ends of each of the restraint plates in a specific direction parallel to one side of the quadrangular shape. At least one of the restraint plates is a specific restraint plate including a first portion and a pair of second portions each having low rigidity against a load input in the stacking direction as compared with the first portion. Each of the second portions is disposed along a direction orthogonal to the specific direction. When viewed from the specific direction, each of the second portions is disposed apart from each other at a location other than a center portion and both end portions of the specific restraint plate.

A length of the specific restraint plate in the specific direction is referred to as a specific direction length. A center of one of the second portions in the specific direction may be located within a range of plus or minus 10% of the specific direction length with a position of one fourth of the specific direction length from one end of the specific restraint plate in the specific direction as a center position. A center of another of the second portions in the specific direction may be located within a range of plus or minus 10% of the specific direction length with a position of three fourths of the specific direction length from the one end of the specific restraint plate in the specific direction as a center position.

Each of the second portions may have a smaller thickness in the stacking direction than the first portion.

In a cross section along the specific direction, the first portion may be flat and each of the second portions may be protruded.

Each of the second portions may be made of a material having a Young's modulus lower than a material of the first portion.

The specific restraint plate may include a plurality of beads extending along the specific direction. Then, each of the second portions may be a portion including a notch provided along a direction orthogonal to the specific direction for at least one of the beads.

With the battery pack according to the present disclosure, at least one of the restraint plates includes the second portions having low rigidity against a load input in the stacking direction as compared with the first portion. As a result, a restraint surface pressure applied to the stacked battery can be equalized while suppressing an increase in weight of the restraint plate. Further, the second portions having low rigidity is provided as described above, so that the amount of impact energy absorbed (consumed) utilizing deformation of the restraint plate can be increased when an impact load is applied from one end side in the specific direction. This makes it possible to improve the impact resistance performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In each of the embodiments described below, the elements common to each figure are designated by the same reference signs, and duplicate description will be omitted or simplified. Further, in the following embodiments, when the number, a quantity, an amount, or a range of each element, for example, is mentioned, the technical idea of the present disclosure is not limited to the mentioned number, etc., unless otherwise specified or except for the case where the number is obviously limited to the number mentioned in the embodiments in principle. Further, configurations, etc. that will be described in the following embodiments are not necessarily essential to the technical ideas according to the present disclosure, unless otherwise specified or except for the case where configurations are obviously limited to the configurations mentioned in the embodiments in principle.

1. First Embodiment 1-1. Overall Configuration of Battery Pack

Figure 1:
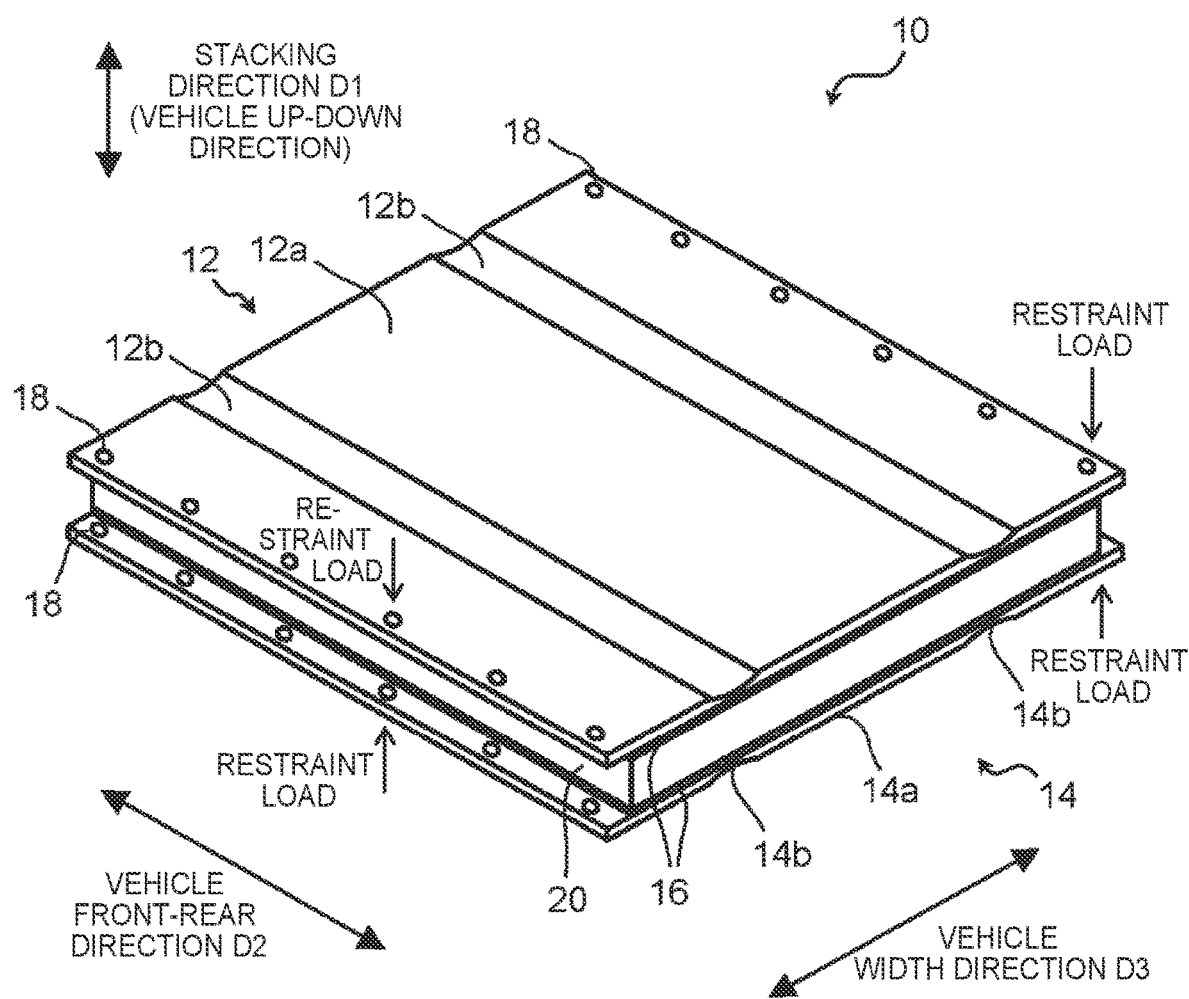
FIG. 1 is a perspective view showing a schematic configuration of a battery pack according to a first embodiment.

FIG. 1 is a perspective view showing a schematic configuration of a battery pack 10 according to a first embodiment. The battery pack 10 is mounted on a vehicle and supplies electric power to the vehicle. The battery pack 10 includes a stacked battery 20 and a pair of restraint plates 12 and 14.

The stacked battery 20 is a stack including a plurality of battery cells 34 (see FIG. 3 described below) stacked in a stacking direction D1 parallel to a vehicle up-down direction. The stacked battery 20 has a rectangular parallelepiped shape that is thinner in the stacking direction D1 than in a vehicle front-rear direction D2 and a vehicle width direction D3.

Each of the restraint plates 12 and 14 has a quadrangular shape (for example, a rectangular shape or a square shape) when viewed from the stacking direction D1. The restraint plate 12 is disposed on the upper side of the stacked battery 20 in the vehicle up-down direction, and the restraint plate 14 is disposed on the lower side of the stacked battery 20 in the vehicle up-down direction. An insulating sheet 16 is interposed between the restraint plate 12 and the stacked battery 20, and between the stacked battery 20 and the restraint plate 14, respectively. Instead of such an insulating sheet 16, insulating coating may be applied to each of the restraint plates 12 and 14.

Each of the restraint plates 12 and 14 is made of, for example, a metal material such as iron or aluminum. Further, each of the restraint plates 12 and 14 may be made of a fiber reinforced plastic such as glass fiber reinforced plastic (GFRP) or carbon fiber reinforced plastic (CFRP) instead of the metal material.

Each of the restraint plates 12 and 14 pressurizes and restrains the stacked battery 20 from both sides thereof in the stacking direction D1. Specifically, the battery pack 10 includes side wall members (not shown) that cover the four side surfaces of the stacked battery 20. The restraint plate 12 and the restraint plate 14 are fastened with a bolt (not shown) via the side wall members located therebetween.

As shown in FIG. 1, each of a plurality of bolt holes 18 for fastening the restraint plates 12 and 14 is, for example, provided at predetermined pitches in the vehicle front-rear direction D2 on both ends of each of the restraint plates 12 and 14 in the vehicle width direction D3. Therefore, the bolts are inserted into the bolt holes 18, and each of the restraint plates 12 and 14 is fastened via the above side wall members, so that a restraint load for pressurizing and restraining the stacked battery 20 from both sides thereof in the stacking direction D1 is applied to each of the restraint plates 12 and 14 on both ends thereof in the vehicle width direction D3. As a result, a restraint surface pressure is applied to each of the upper surface and the lower surface of the stacked battery 20.

In an example of the battery pack 10 shown in FIG. 1, the vehicle width direction D3 corresponds to a "specific direction parallel to one side of a quadrangular shape in each of the restraint plates having a quadrangular shape" according to the present disclosure. However, the "specific direction" is not limited to the vehicle width direction D3. That is, the "specific direction" differs depending on in which direction the restraint load is applied to the both ends of each of the restraint plates 12 and 14. Therefore, in another example in which the above bolt holes 18 are provided on each of the restraint plates 12 and 14 on both ends thereof in the vehicle front-rear direction D2 instead of the vehicle width direction D3, the vehicle front-rear direction D2 corresponds to another example of the "specific direction". Further, joint of the restraint plates 12 and 14 via the four side walls may not be limited to the example in which the restraint plates 12 and 14 are fastened with the bolts, and may be performed using another method such as welding.

In the battery pack 10, the restraint plates 12 and 14 and the above side wall members constitute a battery case that covers the stacked battery 20. The battery pack 10 is attached to the vehicle, for example, by joining (for example, bolt fastening or welding) the lower restraint plate 14 that functions as a part of the battery case and a predetermined vehicle body member. However, the restraint plates 12 and 14 do not necessarily have the function of a case (battery case) of the battery pack 10. That is, an upper cover may be provided above the restraint plate 12 in the vehicle up-down direction, or a lower case may be provided below the restraint plate 14 in the vehicle up-down direction.

In addition, in the example shown in FIG. 1, the vehicle is provided with one battery pack 10 that houses one stacked battery 20 having the large surface areas of the upper and lower surfaces as shown in FIG. 1. As the capacity (electric power amount) of the battery pack 10 required for the vehicle increases, the surface areas of the upper and lower surface of the stacked battery 20 increase.

1-2. Configuration of Stacked Battery

Figure 2:
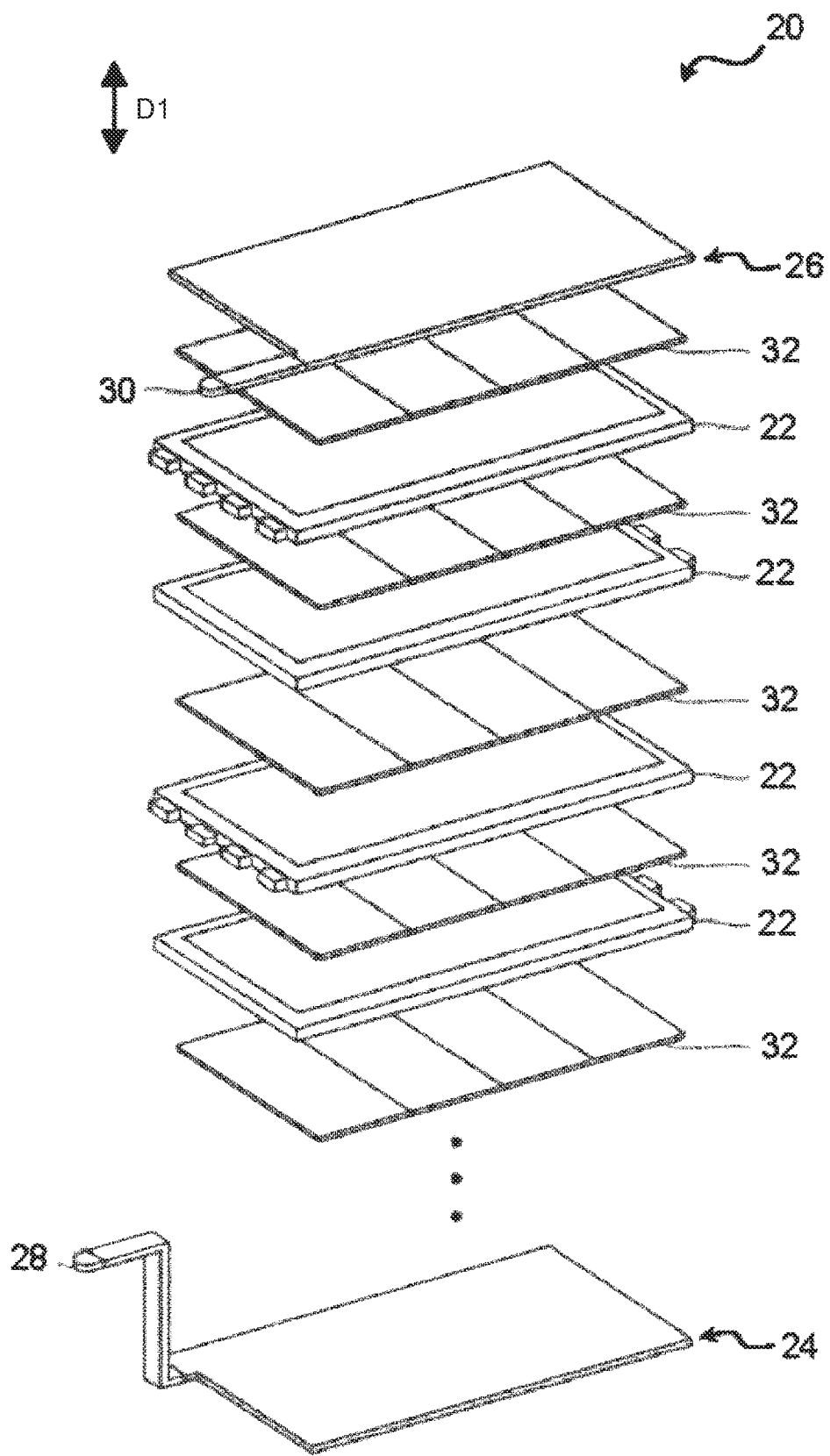
FIG. 2 is an exploded perspective view schematically showing an example of a configuration of a stacked battery shown in FIG. 1.

FIG. 2 is an exploded perspective view schematically showing an example of a configuration of the stacked battery 20 shown in FIG. 1. The stacked battery 20 (hereinafter, also simply referred to as a "battery 20") is a rechargeable secondary battery. The battery 20 includes cell stacks 22, a positive electrode current collector plate 24, a negative electrode current collector plate 26, a positive electrode current collector terminal 28, and a negative electrode current collector terminal 30.

In an example shown in FIG. 2, the battery 20 includes stacked cell stacks 22. The positive electrode current collector plate 24 and the negative electrode current collector plate 26 are disposed so as to interpose the cell stacks 22. The number of the cell stacks 22 disposed between the positive electrode current collector plate 24 and the negative electrode current collector plate 26 is not particularly limited and may be one. Further, in the example shown in FIG. 2, the cell stacks 22 are alternately stacked with cooling plates 32 for cooling the cell stacks 22. The cooling plate 32 is made of a metal such as aluminum or copper, and is electrically connected to the adjacent cell stacks 22 in series.

Figure 3:
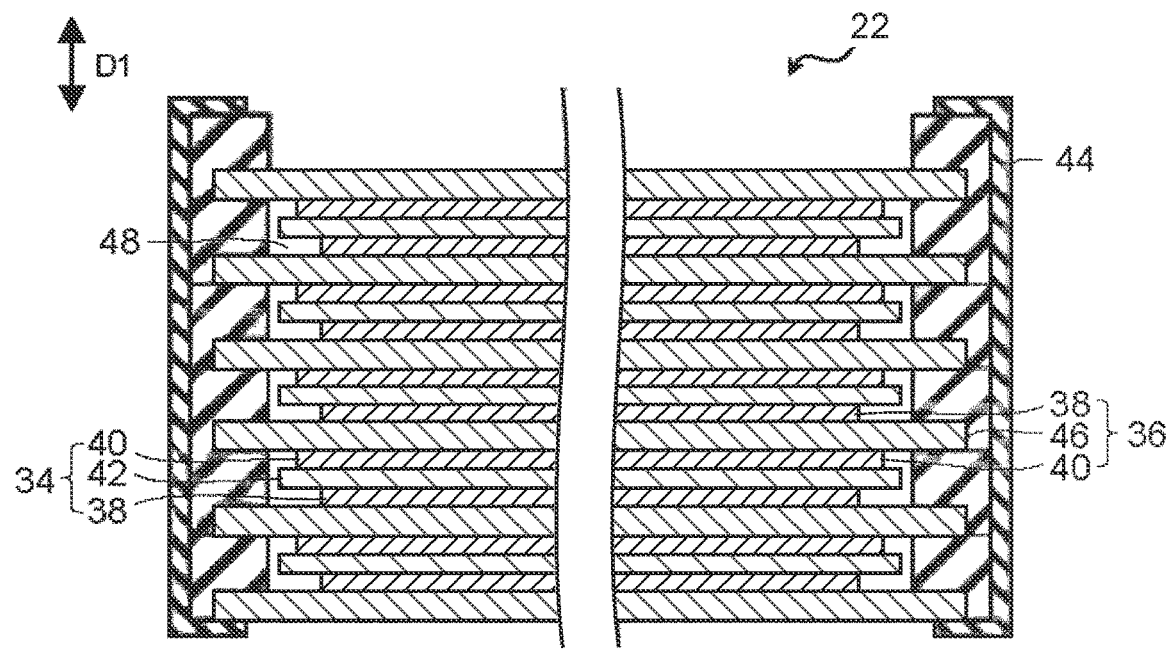
FIG. 3 is a cross-sectional view schematically showing an example of a structure of a cell stack shown in FIG. 2.

FIG. 3 is a cross-sectional view schematically showing an example of a structure of the cell stack 22 shown in FIG. 2. The cell stack 22 is configured by stacking a plurality of battery cells 34 in one direction. Each battery cell 34 is configured such that a positive electrode layer 38 of one adjacent bipolar electrode plate 36 and a negative electrode layer 40 of the other adjacent bipolar electrode plate 36 face each other via a separator (electrolyte layer) 42.

More specifically, the cell stack 22 includes a frame body 44 together with a plurality of the bipolar electrode plates 36 and a plurality of the separators 42. Each bipolar electrode plate 36 is supported by the frame body 44 so as to be disposed at intervals in the stacking direction D1. The separator 42 is disposed between the adjacent bipolar electrode plates 36.

Each bipolar electrode plate 36 includes an electrode plate portion 46, the positive electrode layer 38, and the negative electrode layer 40. The electrode plate portion 46 is made of a metal material such as nickel. The positive electrode layer 38 contains a positive electrode active material. As the positive electrode active material, for example, nickel hydroxide is used. The negative electrode layer 40 contains a negative electrode active material. As the negative electrode active material, for example, a hydrogen adsorption alloy is used. As shown in FIG. 3, only one of the positive electrode layer 38 and the negative electrode layer 40 is formed on the electrode plate portion 46 located at both ends in the stacking direction D1. The separator 42 is formed in a sheet shape. The separator 42 is configured by using, for example, a porous film made of a polyolefin-based resin.

Inside the cell stack 22 configured as described above, housing spaces 48 are provided by the adjacent electrode plate portions 46 and the frame body 44. The separator 42, the positive electrode layer 38, the negative electrode layer 40, and an electrolytic solution (not shown) are disposed in the housing space 48. The electrolytic solution is, for example, an alkaline solution such as an aqueous solution of potassium hydroxide. The battery cell 34 is composed of the separator 42, the negative electrode layer 40, the positive electrode layer 38, and the electrolytic solution. The battery cells 34 are arranged in the stacking direction D1. Each battery cell 34 is connected in series by the electrode plate portion 46. When the battery 20 is discharged, the current flows from the upper side (the negative electrode current collector plate 26 side) to the lower side (the positive electrode current collector plate 24 side) in FIG. 3 inside the cell stack 22.

In an example shown in FIG. 3, the separator 42 impregnated with the electrolytic solution is exemplified as the electrolyte layer, but instead of the separator 42, for example, a solid electrolyte or a gel electrolyte may be used. Further, in the example shown in FIG. 3, the bipolar type battery 20 is exemplified. However, the "stacked battery" according to the present disclosure may not be limited to the bipolar type, and may be a monopolar type. That is, the cell stack included in the "stacked battery" according to the present disclosure may be configured by stacking the battery cells configured such that the positive electrode layer of one adjacent electrode plate and a negative electrode layer of the other adjacent electrode plate face each other via the electrolyte layer.

1-3. Rigidity Reducing Structure of Restraint Plate

The battery pack including the stacked battery is required to uniformly apply a restraint surface pressure equal to or higher than a certain threshold value TH (see FIG. 7 described below) to the upper surface and the lower surface of the stacked battery. Here, when a restraint load is applied to each of the restraint plates on both ends thereof in the vehicle width direction D3 (specific direction) as described above, bending deformation occurs in each of the restraint plates. Unlike the restraint plates 12 and 14 each having the "rigidity reducing structure" according to the present embodiment, which is described below, when each of the restraint plates for applying the restraint surface pressure to the stacked battery is a simple flat plate, the center portion of each of the restraint plates in the vehicle width direction D3 is easily lifted when the center portion thereof is bent (see FIG. 6A described below). As a result, the restraint surface pressure in the center portion is easily released, so that it becomes difficult to apply a uniform restraint surface pressure to the stacked battery regardless of a position on the restraint plate in the vehicle width direction D3. Further, when the thickness of each of the restraint plates is increased in order to suppress bending deformation and secure a uniform restraint surface pressure, the weight of the restraint plate increases.

Therefore, the battery pack including the stacked battery is required to be able to apply a more uniform surface pressure to the stacked battery while suppressing an increase in the weight of the restraint plate. Further, the battery pack is also required to be able to improve the impact resistance performance at the time of a vehicle collision.

In view of the above issues, the restraint plates 12 and 14 according to the present embodiment have the following "rigidity reducing structure".

As shown in FIG. 1, the restraint plate 12 includes a first portion 12*a* and a pair of second portions 12*b*. The second portions 12*b* are portions having low rigidity (more specifically, bending rigidity) against a load input in the stacking direction D1 as compared with the first portion 12*a*. More specifically, the first portion 12*a* is a portion of the restraint plate 12 other than the second portions 12*b*.

Each of the second portions 12*b* is disposed along the vehicle front-rear direction D2 that is a direction orthogonal to the vehicle width direction D3 (specific direction). More specifically, in the example shown in FIG. 1, each of the second portions 12*b* extends from one end to the other end of the restraint plate 12 in the vehicle front-rear direction D2. When viewed from the vehicle width direction D3, each of the second portions 12*b* is disposed apart from each other at a location other than the center portion and the both end portions of the restraint plate 12.

The restraint plate 14 includes a first portion 14*a* and a pair of second portions 14*b*. The restraint plate 14 also has a rigidity reducing structure. Since the rigidity reducing structure of the restraint plate 14 is the same as that of the restraint plate 12, detailed description thereof will be omitted here.

Figure 4:
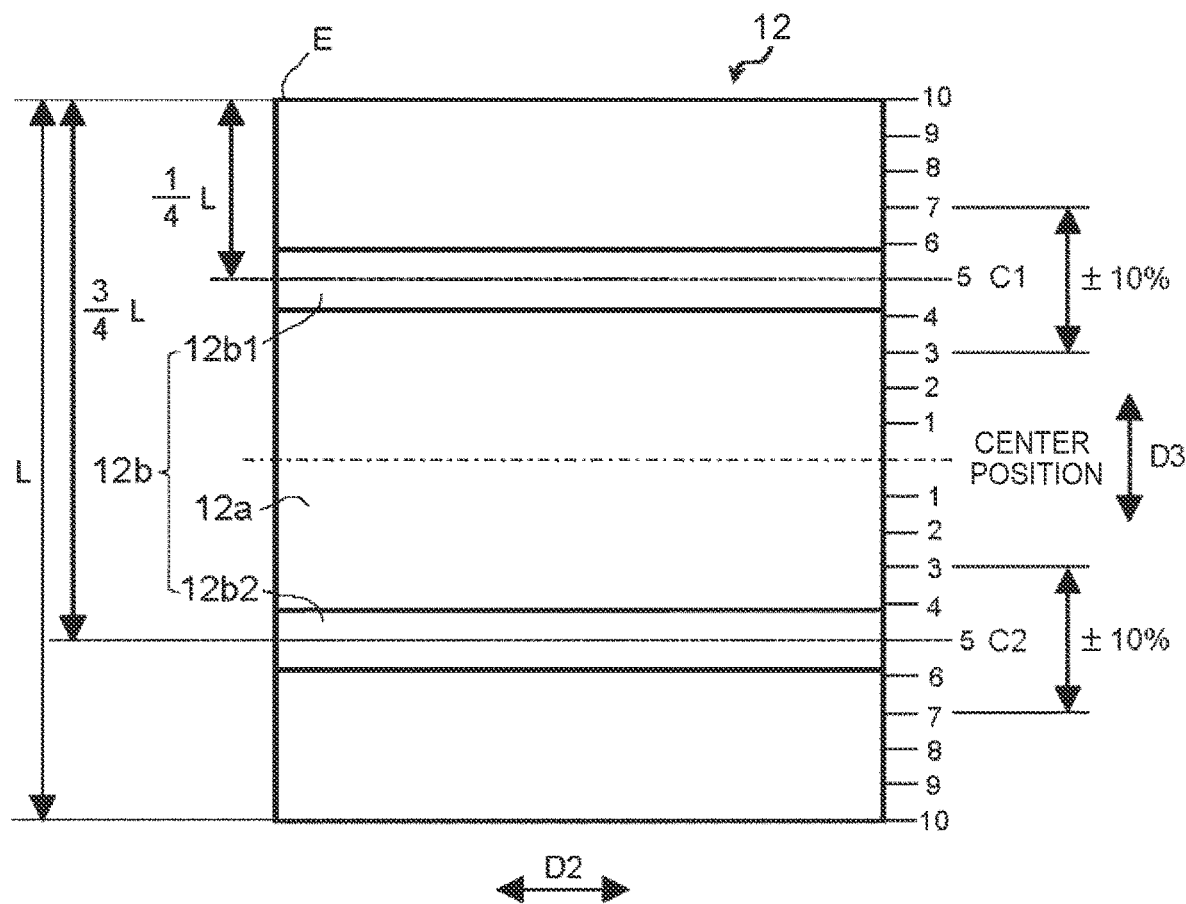
FIG. 4 is a diagram for illustrating a preferable layout range R of a pair of second portions according to the present disclosure.

Next, with reference to FIG. 4, an example of a preferable layout range of each of the second portions 12*b* in the vehicle width direction D3 will be described. FIG. 4 is a view looking down on the restraint plate 12 from the upper side of the vehicle. In the present embodiment, each of the second portions 12*b* is disposed symmetrically about the center position of the restraint plate 12 in the vehicle width direction D3 (specific direction). The length of the restraint plate 12 in the vehicle width direction D3 is referred to as "specific direction length L". As shown in FIG. 4, a center C1 of one portion 12*b*1 that is one of the second portions 12*b* in the vehicle width direction D3 is provided at a position of one fourth of the specific direction length L from one end E in the vehicle width direction D3. Further, a center C2 of the other portion 12*b*2 in the vehicle width direction D3 is provided at a position of three fourths of the specific direction length L from the one end E.

The preferable layout of each of the second portions 12*b* in the vehicle width direction D3 may not be limited to the examples of the portions 12*b*1 and 12*b*2 shown in FIG. 4, and may be within the following layout range R. That is, the center of the portion 12*b*1 may be located within the range of plus or minus 10% of the specific direction length L with the position of one fourth of the specific direction length L from the one end E in vehicle width direction D3 as a center position. Further, the center of the other portion 12*b*2 may be located within the range of plus or minus 10% of the specific direction length L with the position of three fourths of the specific direction length L from the one end E as a center position.

Figure 5:
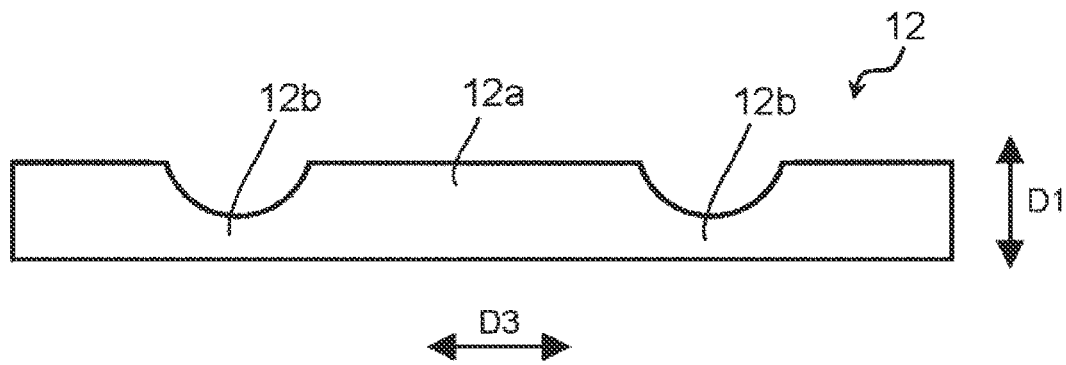
FIG. 5 is a diagram showing a specific configuration example of the second portions according to the first embodiment.

FIG. 5 is a diagram showing a specific configuration example of the second portions 12*b* according to the first embodiment. FIG. 5 is a view of the restraint plate 12 seen from the vehicle front-rear direction D2. As shown in FIG. 5, each of the second portions is a portion with a groove having a semicircular shape in cross section. As a result, each of the second portions has a smaller thickness in the stacking direction D1 than the first portion 12*a*. A specific configuration example of the restraint plate 14 is obtained by inverting the restraint plate 12 shown in FIG. 5 in the stacking direction D1.

1-4. Effect

Figure 6A:
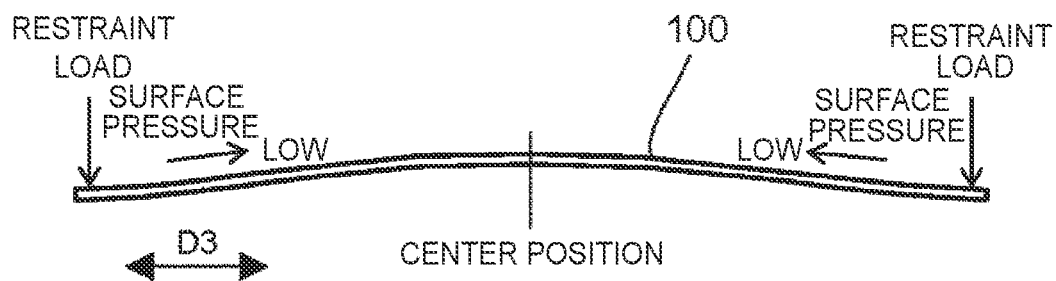
FIG. 6A is a diagram for illustrating an effect of equalizing a restraint surface pressure by a rigidity reducing structure according to the first embodiment.
Figure 6B:
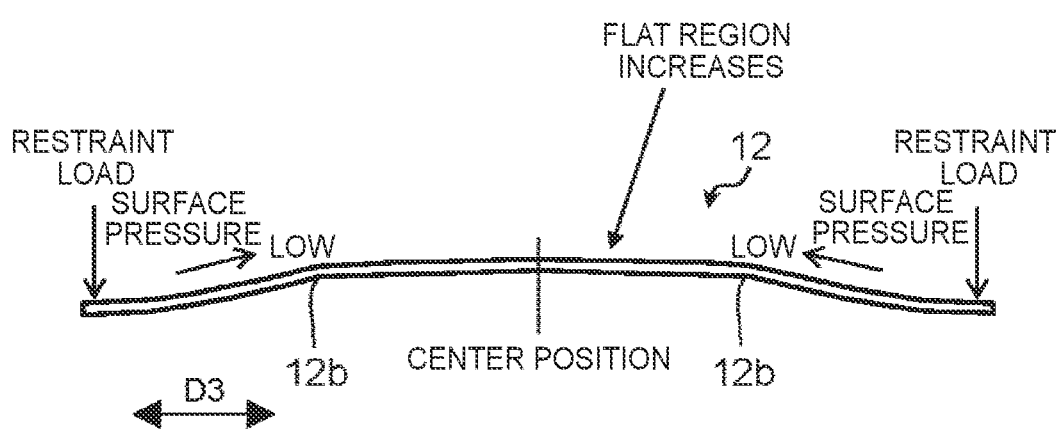
FIG. 6B is a diagram for illustrating an effect of equalizing the restraint surface pressure by the rigidity reducing structure according to the first embodiment.

First, an effect of equalizing the restraint surface pressure by the rigidity reducing structure according to the first embodiment will be described with reference to FIGS. 6A and 6B and FIG. 7. FIGS. 6A and 6B each show a cross section of the restraint plate cut along the vehicle width direction D3 (specific direction). The horizontal axis in FIG. 7 indicates a position on the restraint plate in the vehicle width direction D3. A comparative example shown in FIGS. 6A and 7 corresponds to a configuration including a restraint plate 100 having a flat shape without the rigidity reducing structure.

When the above restraint load is applied to both ends of the restraint plate 100 in the comparative example, the restraint plate 100 is deformed such that a peak occurs at the center position thereof in the vehicle width direction D3 as shown in FIG. 6A. As a result, as shown in FIG. 7, the restraint surface pressure in the comparative example decreases while maintaining a high reduction rate as the restraint surface pressure moves from each end of the restraint plate 100 toward the center position thereof.

On the other hand, the restraint plate 12 according to the present embodiment has a rigidity reducing structure using the second portions 12*b* having low rigidity as compared with the surrounding first portion 12*a*. Deformation of the section from each end of the restraint plate 12 to each of the second portions 12*b* is the same as that of the comparative example. However, by reducing the rigidity of each of the second portions 12*b*, deformation of the center portion of the restraint plate 12 located between the second portions 12*b* is suppressed. Therefore, as shown in FIG. 6B, a flat region on the center side increases as compared with the comparative example. As a result, the restraint surface pressure at the center position is lowered as in the comparative example, but as shown by the hatching in FIG. 7, a change in the restraint surface pressure according to a position on the restraint plate in the vehicle width direction D3 can be effectively suppressed on the center side. Therefore, as compared with the comparative example (flat plate), the restraint surface pressure can be equalized.

Figure 7:
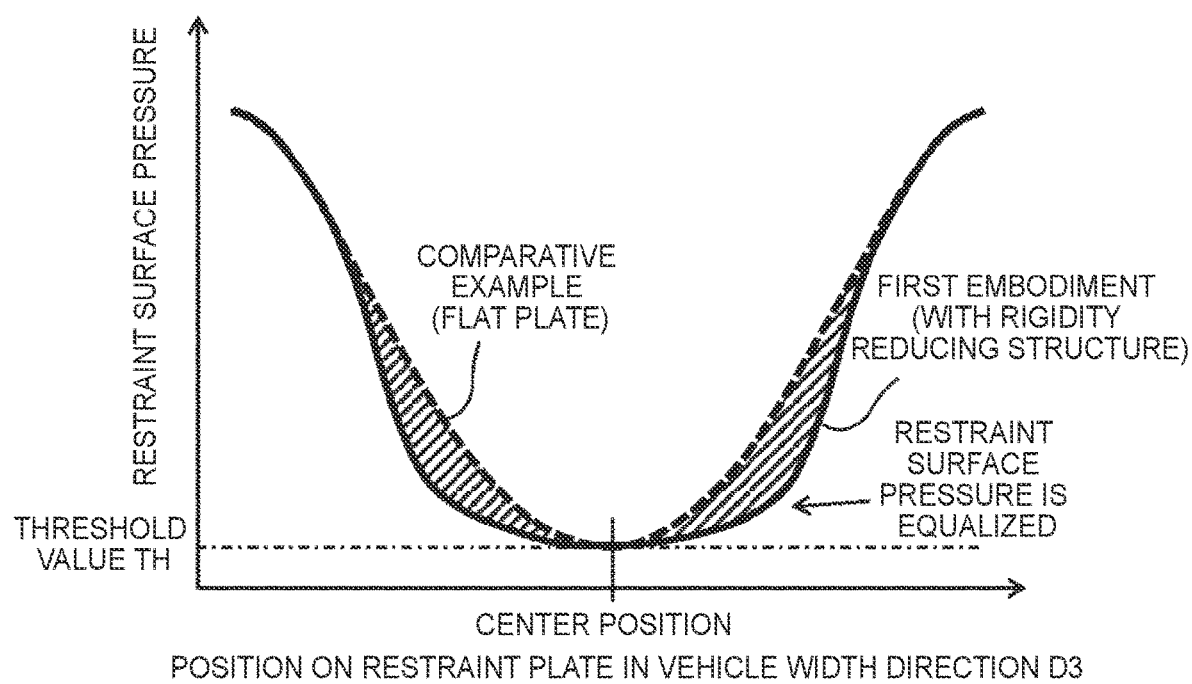
FIG. 7 is a diagram for illustrating an effect of equalizing the restraint surface pressure by the rigidity reducing structure according to the first embodiment.

More specifically, the threshold value TH in FIG. 7 is a threshold value of the restraint surface pressure required to be applied to the stacked battery 20. Then, in the battery pack 10, the restraint surface pressure only needs to satisfy the threshold value TH. When compared with the comparative example, with the restraint plate 12 according to the present embodiment, the magnitude of the restraint surface pressure near the center position is reduced, but the restraint surface pressure can be equalized while ensuring the required surface pressure value (threshold value TH). In addition, the restraint surface pressure can be equalized without relying on the increase in rigidity due to the increase in the thickness of the restraint plate 12, that is, while suppressing the increase in the weight of the restraint plate 12. This also applies to the restraint plate 14 having the same rigidity reducing structure.

Figure 8A:
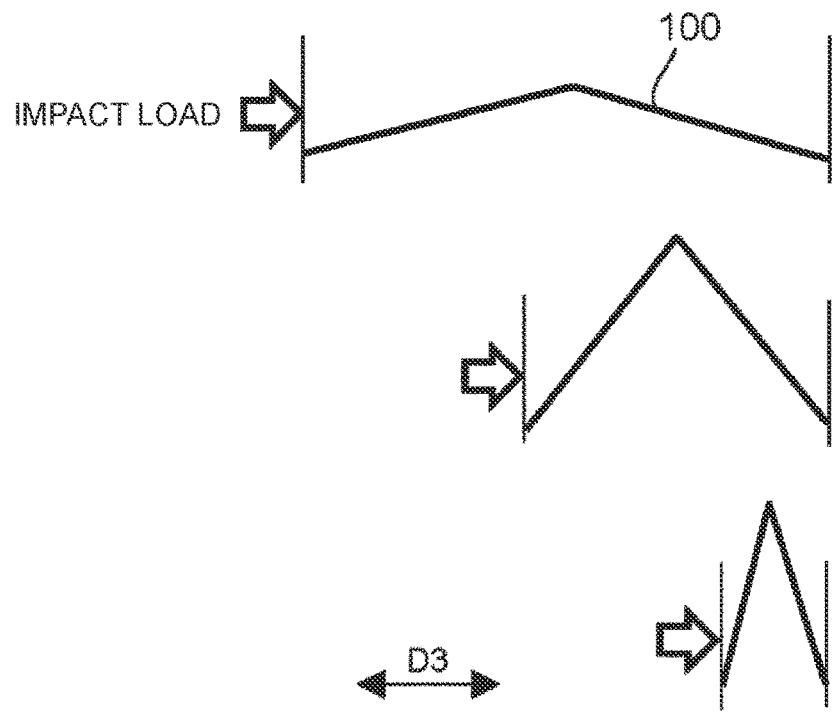
FIG. 8A is a diagram for illustrating an effect of improving impact resistance performance by the rigidity reducing structure according to the first embodiment.
Figure 8B:
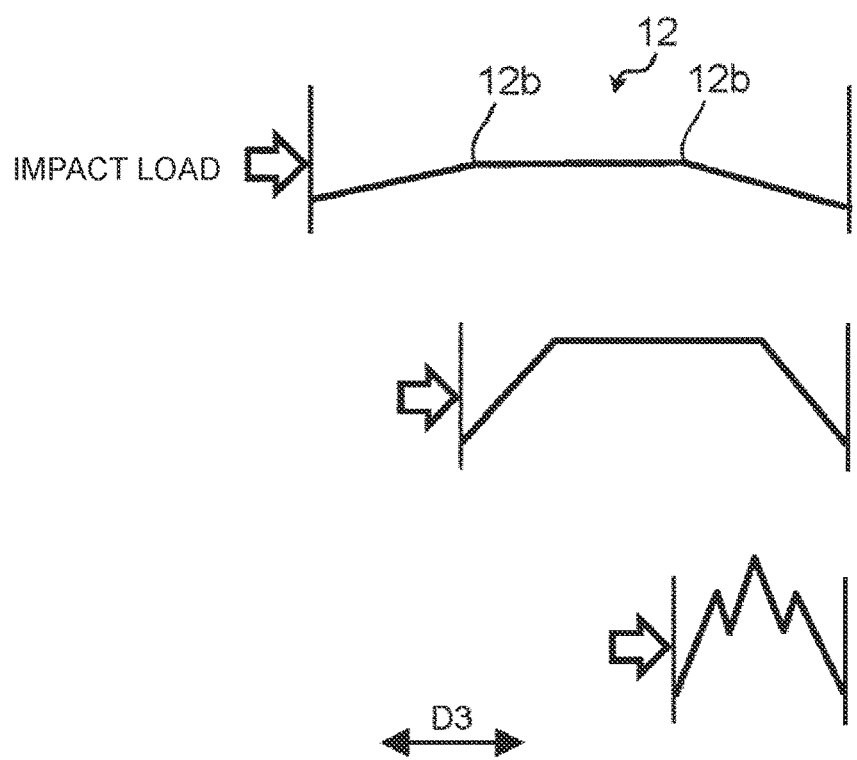
FIG. 8B is a diagram for illustrating an effect of improving the impact resistance performance by the rigidity reducing structure according to the first embodiment.

Next, FIGS. 8A and 8B are diagrams for illustrating the effect of improving the impact resistance performance by the rigidity reducing structure according to the first embodiment, and as in FIGS. 6A and 6B, the restraint plates 100 and 12 are seen from the vehicle front-rear direction D2. More specifically, the upper, the middle and the lower views of respective FIGS. 8A and 8B show how deformation of each of the restraint plates 100 and 12 proceeds with the input of the impact load from one side of the vehicle width direction D3.

First, a comparative example (flat plate) will be described. When the restraint plate 100 having a flat plate shape cannot withstand the impact load, the restraint plate 100 begins to be deformed as shown in the upper view of FIG. 8A. Once the deformation occurs, the restraint plate 100 is less likely to generate a reaction force against the impact load. As a result, as shown in the middle and lower views of FIG. 8A, the deformation proceeds.

On the other hand, in the restraint plate 12 having a rigidity reducing structure, as shown in the upper view of FIG. 8B, deformation is likely to occur in each of the second portions 12b at the initial stage of inputting the impact load. As described above, by intentionally causing the restraint plate 12 to be easily deformed (bent) at each of the second portions 12b, the length of each portion (three portions including the portion on the center side and the portions on the end sides) of the restraint plate 12 that is distinguished by each bending point becomes short as compared with the comparative example in which the restraint plate 12 has been bent. Therefore, the rigidity of each portion after the restraint plate 12 has been bent is increased. As a result, as compared with the comparative example, in the restraint plate 12, it is possible to increase the reaction force against the impact load after the restraint plate 12 has been bent. In other words, the amount of impact energy absorbed (consumed) using the deformation of the restraint plate 12 can be increased as compared with the comparative example. This makes it possible to improve the impact resistance performance. This also applies to the restraint plate 14 having the same rigidity reducing structure.

As described above, with the battery pack 10 according to the present embodiment, it is possible to apply a more uniform restraint surface pressure to the stacked battery 20 while suppressing the increase in the weight of each of the restraint plates 12 and 14, and to improve the impact resistance performance.

In addition, when each of the "pair of second portions" in the "specific direction (for example, the vehicle width direction D3)" according to the present disclosure is too close to the center position of the "specific direction", the range in which the restraint surface pressure can be equalized is short. On the contrary, when each of the "pair of second portions" is too far from the center position, the restraint surface pressure itself is reduced even though the restraint surface pressure of the portion located between each of the "pair of second portions" can be equalized. With respect to these points, according to the above layout range R, the location of each of the second portions can be appropriately selected such that a uniform restraint surface pressure can be more effectively applied at a value equal to or higher than the above threshold value TH.

1-5. Modification

Each of the "pair of second portions" according to the present disclosure may be provided such that the thickness thereof in the stacking direction D1 is reduced as compared with the "first portion" by adopting, for example, the following shape examples shown in FIGS. 9 to 12 instead of the example shown in FIG. 5.

Figure 9:
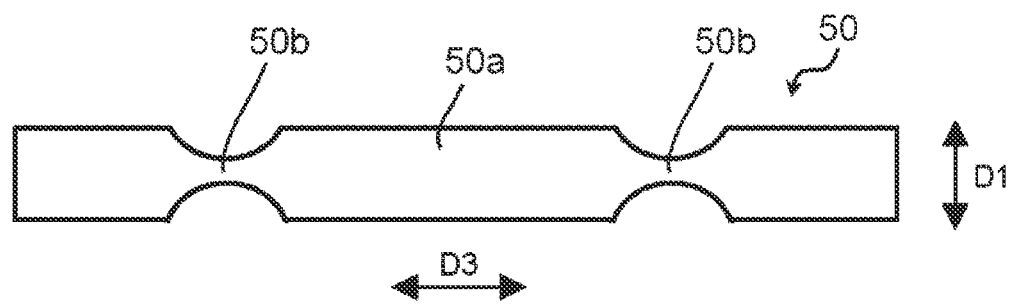
FIG. 9 is a diagram showing a specific configuration example of a restraint plate according to a first modification of the first embodiment.

FIG. 9 is a diagram showing a specific configuration example of a restraint plate 50 according to a first modification of the first embodiment. The restraint plate 50 includes a first portion 50a and a pair of second portions 50b. In this first modification, each of the second portions 50b is a portion with a groove having a semicircular shape in cross section on both sides of the restraint plate 50 in the stacking direction D1.

Figure 10:
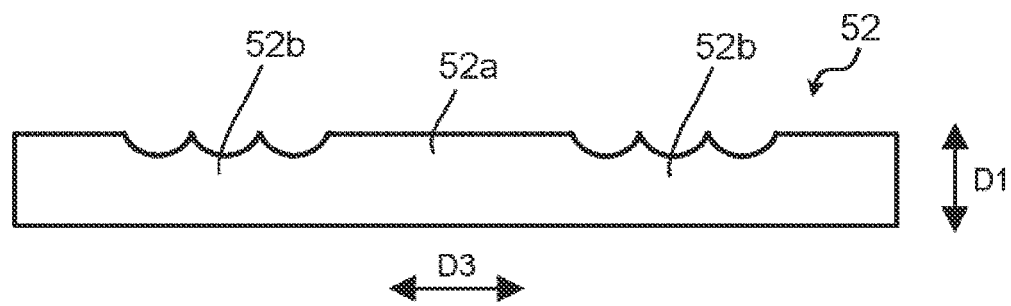
FIG. 10 is a diagram showing a specific configuration example of a restraint plate according to a second modification of the first embodiment.

FIG. 10 is a diagram showing a specific configuration example of a restraint plate 52 according to a second modification of the first embodiment. The restraint plate 52 includes a first portion 52a and a pair of second portions 52b. In this second modification, each of the second portions 52b is a portion with a plurality of (for example, three) small grooves. Each of the small grooves has a semicircular shape in cross section. Such a groove may be provided on both sides of the restraint plate 52 in the stacking direction D1.

Figure 11:
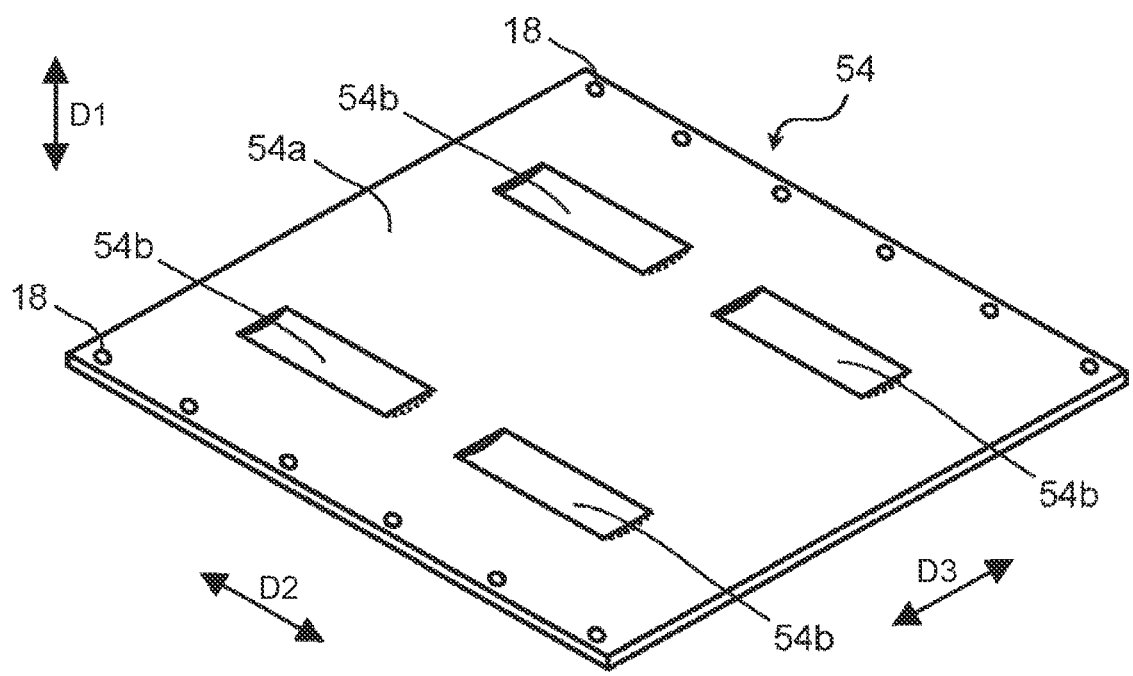
FIG. 11 is a diagram showing a specific configuration example of a restraint plate according to a third modification of the first embodiment.

FIG. 11 is a diagram showing a specific configuration example of a restraint plate 54 according to a third modification of the first embodiment. The restraint plate 54 includes a first portion 54a and a pair of second portions 54b. In the example shown in FIG. 1, each of the second portions 12b extends from one end to the other end of the restraint plate 12 in the vehicle front-rear direction D2. On the other hand, in the third modification, each of the second portions 54b is a portion with a plurality of (for example, two) grooves. Each of the grooves is disposed on a part of the restraint plate 54 along the vehicle front-rear direction D2 (that is, the direction orthogonal to the "specific direction"). In other words, each of the second portions 54b is provided as a plurality of (for example, two) divided portions along the vehicle front-rear direction D2.

Figure 12:
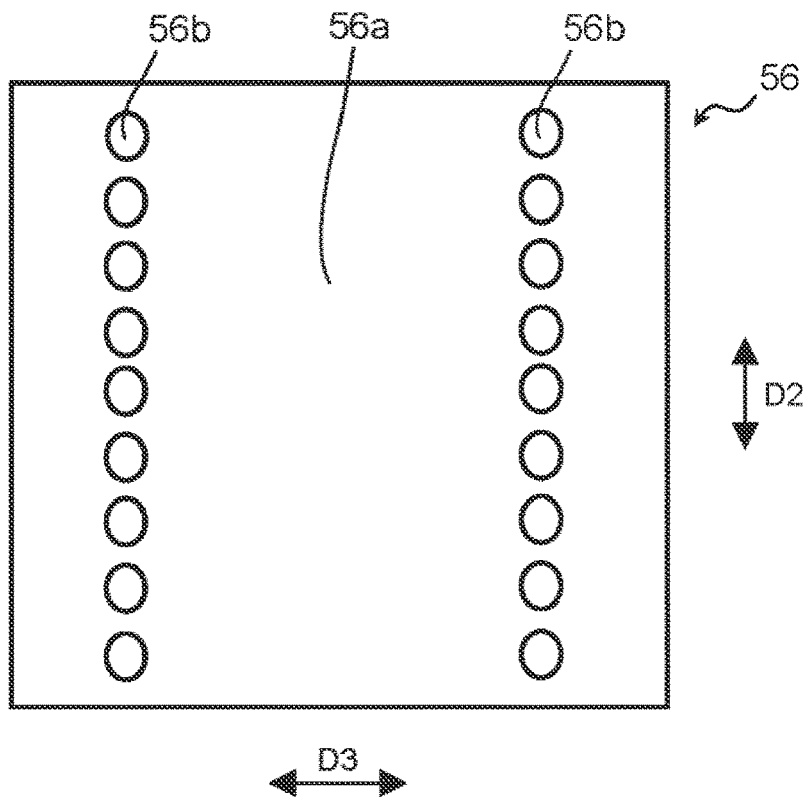
FIG. 12 is a diagram showing a specific configuration example of a restraint plate according to a fourth modification of the first embodiment.

FIG. 12 is a diagram showing a specific configuration example of a restraint plate 56 according to a fourth modification of the first embodiment. The restraint plate 56 includes a first portion 56a and a pair of second portions 56b. In this fourth modification as well, as in the third modification, each of the second portions 56b is partially disposed along the vehicle front-rear direction D2. In the fourth modification, each of the second portions 56b is a portion with a plurality of (for example, nine) through holes. Each of the through holes has, for example, a circular shape. Instead of the through holes, a plurality of spherical recesses may be used.

2. Second Embodiment

Figure 13:
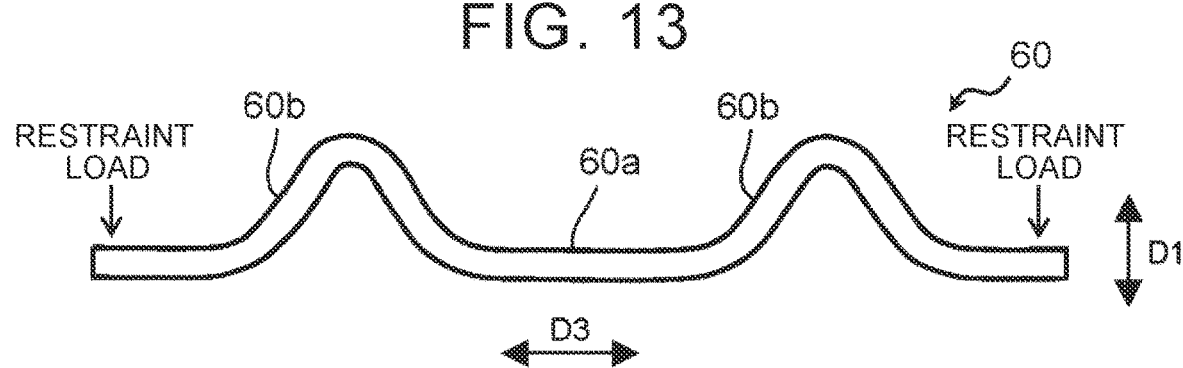
FIG. 13 is a diagram showing a specific configuration example of a restraint plate according to a second embodiment.

The second embodiment is different from the first embodiment in a configuration method of a "pair of second portions". FIG. 13 is a diagram showing a specific configuration example of a restraint plate 60 according to the second embodiment. FIG. 13 shows a cross section of the restraint plate 60 along the vehicle width direction D3 (specific direction).

The restraint plate 60 includes a first portion 60a and a pair of second portions 60b. In the first embodiment, each of the second portions 12b is configured such that the thickness of the second portion 12b is different from that of the first portion 12a. On the other hand, in the second embodiment, each of the second portions 60b is configured using the change in the cross-sectional shape without changing the thickness of the restraint plate 60. That is, as shown in FIG. 13, in the cross section along the vehicle width direction D3, the first portion 60a is flat, and each of the second portions 60b is protruded.

When a load for bending the restraint plate 60 is applied to each end thereof in the vehicle front-rear direction D2, for example, each of the second portions 60b having a protruding shape exhibits high rigidity against the load. On the other hand, each of the second portions 60b having a protruding shape is more likely to be bent (that is, the rigidity is reduced) with respect to the restraint load applied to each end of the restraint plate 60 in the vehicle width direction D3 as shown in FIG. 13, as compared with the flat plate. Therefore, even when the restraint plate 60 is adopted instead of the restraint plates 12 and 14 according to the first embodiment, the same effect as that of the first embodiment can be obtained.

3. Third Embodiment

Figure 14:
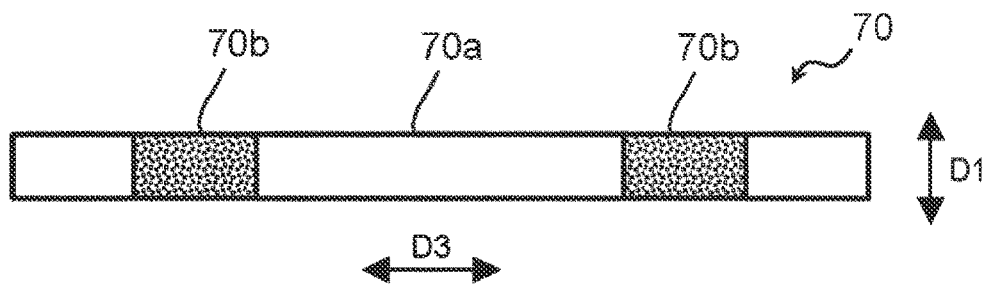
FIG. 14 is a diagram showing a specific configuration example of a restraint plate according to a third embodiment.

The third embodiment is different from the first embodiment or the second embodiment in a configuration method of a "pair of second portions". FIG. 14 is a diagram showing a specific configuration example of a restraint plate 70 according to the third embodiment. FIG. 14 shows a cross section of the restraint plate 70 along the vehicle width direction D3 (specific direction).

The restraint plate 70 includes a first portion 70*a* and a pair of second portions 70*b*. In the third embodiment, a difference in rigidity between the first portion 70*a* and the second portions 70*b* is given by utilizing a difference in materials. That is, each of the second portions 70*b* is made of a material having a Young's modulus lower than that of the first portion 70*a*.

Specifically, for example, both of the first portion 70*a* and the second portions 70*b* may be made of a fiber reinforced plastic such as GFRP or CFRP. Then, the difference in rigidity may be given by lowering the fiber content of each of the second portions 70*b* as compared with the first portion 70*a*.

Further, in order to give the difference in rigidity, for example, the first portion 70*a* may be made of a metal material, and each of the second portions 70*b* may be made of a resin material. The restraint plate 70 in such an example can be formed by using, for example, a resin metal joining method such as insert molding.

In addition, instead of the above specific example, the difference in rigidity described above may be given by using, for example, two kinds of metal materials having different Young's moduli. The restraint plate 70 in such an example can be formed by using any joining method such as welding or a combination of bolts and nuts.

Even when the restraint plate 70 according to the third embodiment described above is adopted instead of the restraint plates 12 and 14, the same effect as that of the first embodiment can be obtained.

4. Fourth Embodiment

Figure 15:
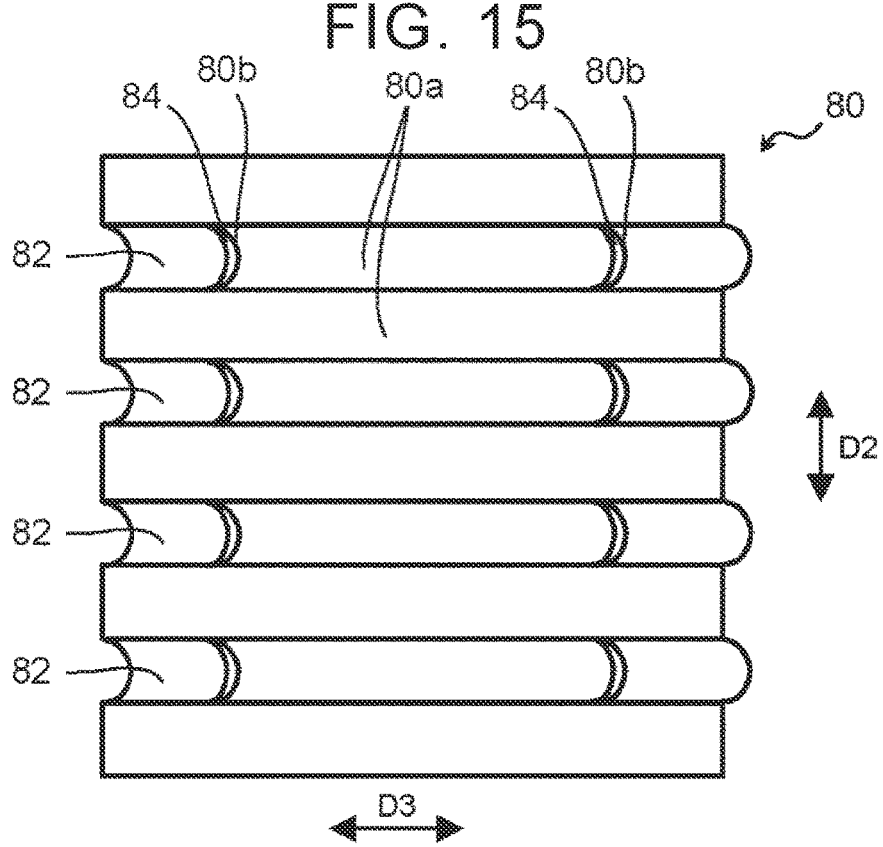
FIG. 15 is a diagram showing a specific configuration example of a restraint plate according to a fourth embodiment.

The fourth embodiment is different from the first to third embodiments in a configuration method of a "pair of second portions". FIG. 15 is a diagram showing a specific configuration example of a restraint plate 80 according to the fourth embodiment.

The restraint plate 80 includes a first portion 80*a* and a pair of second portions 80*b*. As shown in FIG. 15, the restraint plate 80 (specific restraint plate) includes a plurality of beads 82 extending along the vehicle width direction D3 (specific direction). As an example, the number of the beads 82 is four. Such a bead 82 is provided to increase the basic rigidity of the restraint plate 80.

Further, in the fourth embodiment, each of the second portions 80*b* is a portion including a notch 84 provided along the vehicle front-rear direction D2 (that is, the direction orthogonal to the specific direction) for each bead 82. The first portion 80*a* is a portion other than the second portions 80*b* (that is, a portion without the bead 82 and a portion away from the notch 84 for the bead 82). According to such a configuration, the rigidity of the second portion 80*b* having the notch 84 can be reduced with respect to the restraint load applied to each end of the restraint plate 80 in the vehicle width direction D3, as compared with the other portions of the restraint plate 80 (that is, the first portion 80*a*).

Even when the restraint plate 80 according to the fourth embodiment described above is adopted instead of the restraint plates 12 and 14, the same effect as that of the first embodiment can be obtained.

Figure 16:
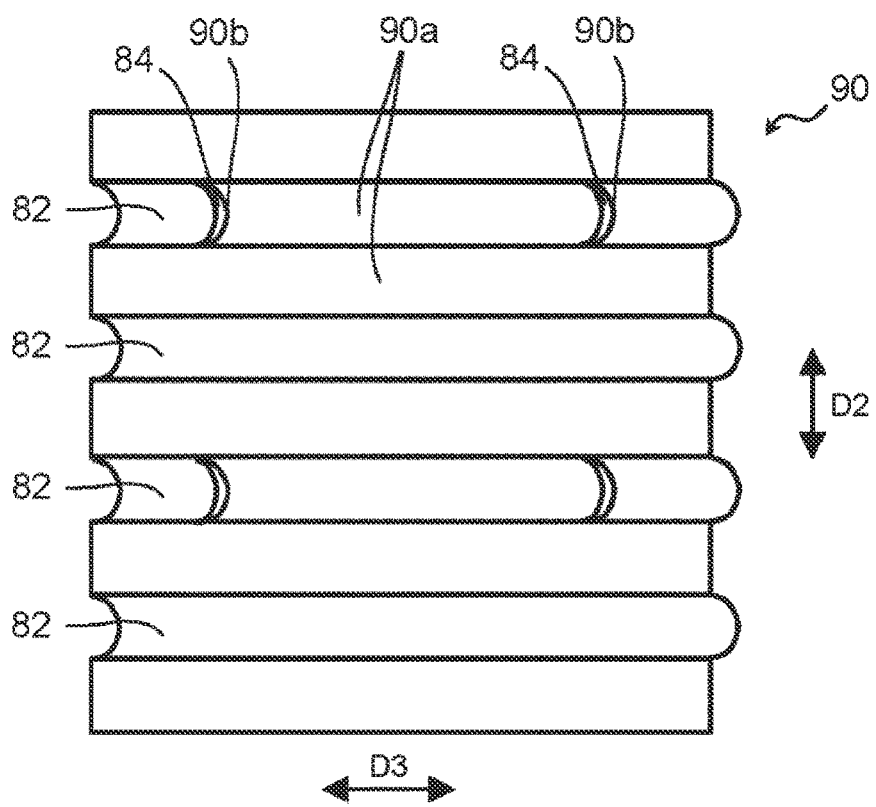
FIG. 16 is a diagram showing a specific configuration example of a restraint plate according to a modification of the fourth embodiment.

FIG. 16 is a diagram showing a specific configuration example of a restraint plate 90 according to a modification of the fourth embodiment. The restraint plate 90 includes a first portion 90*a* and a pair of second portions 90*b*. In this modification, the notch 84 of each of the second portions 90*b* is not provided in all of the beads 82 but provided in a part of the beads 82. More specifically, as a preferable example, the notches 84 are provided in two of the four beads 82 such that the beads 82 without the notches 84 and the beads 82 with the notches 84 are arranged alternately. As in this example, the "notch" according to the present disclosure may be provided in one bead or a plurality of the beads, which is not all of the beads.

In the above first to fourth embodiments, the "rigidity reducing structure" is provided to both of the restraint plates. In other words, both of the restraint plates correspond to the "specific restraint plates" according to the present disclosure. However, the "rigidity reducing structure utilizing the second portions" may be applied to only one of the restraint plates. In other words, only one of the restraint plates may correspond to the "specific restraint plate".

What is claimed is:

1. A battery pack comprising:
 a stacked battery including a plurality of battery cells stacked in a stacking direction parallel to a vehicle up-down direction; and
 a pair of restraint plates each having a quadrangular shape when viewed from the stacking direction, the restraint plates pressurizing and restraining the stacked battery from both sides of the stacked battery in the stacking direction by a restraint load applied to a first end of each of the restraint plates and a second end of each of the restraint plates, the second end being opposite to the first end in a specific direction that is parallel to one side of the quadrangular shape, wherein:
 at least one of the restraint plates is a specific restraint plate including:
  a first portion, and
  a pair of second portions each having low rigidity against a load input in the stacking direction as compared with the first portion;
 each of the second portions is disposed along a direction orthogonal to the specific direction;
 when viewed from the specific direction, each of the second portions is disposed apart from each other at a location other than a center portion and both end portions of the specific restraint plate; and
 each of the second portions includes a groove having a semicircular shape in a cross section along the specific direction, the groove extending in a direction that is parallel to a surface of the specific restraint plate and orthogonal to the specific direction.

2. The battery pack according to claim 1, wherein:
 a length of the specific restraint plate in the specific direction is a specific direction length;
 a center of one of the second portions in the specific direction is located within a range of plus or minus 10% of the specific direction length from a first point, the first point being one fourth of the specific direction length in the specific direction from the first end of the specific restraint plate; and a center of another of the second portions in the specific direction is located within a range of plus or minus 10% of the specific direction length from a second point, the second point being three fourths of the specific direction length in the specific direction from the first end of the specific restraint plate.

3. The battery pack according to claim 1, wherein each of the second portions has a smaller thickness in the stacking direction than the first portion.

4. The battery pack according to claim 1, wherein in the cross section along the specific direction, the first portion is flat and each of the second portions is protruded.

5. The battery pack according to claim 1, wherein each of the second portions is made of a material having a Young's modulus lower than a material of the first portion.

6. The battery pack according to claim 1, wherein:
the specific restraint plate includes a plurality of beads extending along the specific direction; and
each of the second portions is a portion including a notch provided along the direction orthogonal to the specific direction for at least one of the beads.

7. The battery pack according to claim 1, wherein the groove extends from one end to another end of the specific restraint plate in a vehicle front-rear direction.

8. The battery pack according to claim 1, wherein each of the second portions includes a plurality of grooves, each groove among the plurality of grooves having the semicircular shape in the cross section along the specific direction.

9. The battery pack according to claim 1, wherein, when viewed from the specific direction, the first portion is disposed between the second portions that are disposed apart from each other.

* * * * *